Patented Apr. 1, 1941

2,237,092

UNITED STATES PATENT OFFICE 2,237,092

STABILIZATION OF FORMALDEHYDE SOLUTIONS

Robert C. Swain, Riverside, and Pierrepont Adams, Stamford, Conn., assignors to American Cyanamid Company, New York, N. Y., a corporation of Maine No Drawing. Application November 28, 1939, Serial No. 306,516

3 Claims. (Cl. 23—250)

This invention relates to the stabilization of formaldehyde solutions by the addition thereto of compounds capable of preventing polymer formation.

It is well known that aqueous formaldehyde solutions of greater than about 30% strength such as, for example, ordinary U. S. P. formalin of 37% strength are unstable upon storage, particularly at low temperatures, as they will precipitate formaldehyde polymers. For this reason it has been customary to add methanol to such solutions as a stabilizer.

For some uses, and particularly for the manufacture of aminoplastics, formalin solutions containing alcohols are undesirable. For this reason, urea, thiourea and other simple organic nitrogen compounds have been suggested as substitutes. While these materials and particularly urea are effective to stabilize U. S. P. formalin solutions for considerable periods of time they are not altogether satisfactory for the more concentrated formaldehyde solutions.

We have now discovered an effective class of stabilizers for aqueous formaldehyde solutions consisting of melamine and alkylol melamines, particularly methylol melamines. The preferred member of this class, which is melamine itself, can be used in concentrations of 2–6% by weight to stabilize aqueous formaldehyde solutions up to about 45% by weight and in these low concentrations there is no danger of gel formation. Alkylol melamines such as the hexamethylol melamine formed by condensing one mole of melamine with 6 moles of neutral or slightly alkaline formaldehyde are effective in concentrations of 2–5% by weight for stabilizing aqueous formaldehyde solutions of 37% strength or less. These materials will also stabilize stronger formalin solutions such as 42% aqueous formaldehyde, particularly when used in concentrations higher than 5%, but the solution sometimes becomes cloudy upon refrigeration.

It is known that strongly acid formalin solutions, and particularly solutions having a pH of about 3–4, are more easily stabilized than those which are only slightly acid. We have found that this is also true of formalin solutions stabilized with melamine and alkylol melamines; the solutions require smaller amounts of stabilizer and remain clear for longer periods of time at pH values of 3–4 than at higher pH values. However, our invention is not limited to the stabilization of strongly acid formalin solutions as we have found that our new stabilizers are effective in many cases at pH values higher than 7.0.

In practicing our invention we prefer to dissolve or disperse the melamine or alkylol melamine in the formalin solution at room temperatures or, when more rapid stabilization is desired or when concentrations of stabilizer higher than 5% are used, as in treating 45% formaldehyde solutions, at slightly elevated temperatures. After the solutions are stabilized they may be stored, shipped, or treated in any suitable manner without regard to temperature conditions as they are stable even at temperatures as low as 0° C. It is a further advantage of the invention that melamine and alkylol melamines will also stabilize the formaldehyde solutions against excessive oxidation to formic acid.

As has been indicated, our discovery is of particular value in the preparation and storage of formalin solutions for use in the manufacture of aminoplastics such as melamine-formaldehyde and urea-formaldehyde syrups, lacquers and resins. Compositions of these syrups have greatly improved properties, especially in respect to water resistance, when made from alcohol-free formaldehyde.

The invention will be illustrated in greater detail by the following specific examples, which show the results obtained with various materials representative thereof. It is understood, however, that although these examples may describe certain of the more specific features of the invention they are given primarily for purposes of illustration and the invention in its broader aspects is not limited thereto.

Example 1

Since unstabilized solutions of formaldehyde greater than 30% concentration were not obtainable commercially, solutions suitable for testing were prepared from 30% methanol-free formalin by vacuum concentration. The 30% formalin solution was heated at 25–30° C. at 1–5 cm. of mercury pressure until the requisite amount of water had been removed, after which the exact concentration of formaldehyde was determined by analysis. As the concentrated solutions were stable at room temperatures only for a few hours the stabilizer was added immediately.

Each of the stabilizers listed below was added to a concentrated formaldehyde solution with enough distilled water to bring the stabilizer and formaldehyde concentrations to the desired figures. The solutions were then allowed to stand at room temperatures for about 12 hours, with occasional shaking when necessary to dissolve the stabilizer. In the case of some of the stronger formaldehyde solutions the mixture was warmed or heated to accelerate solution of the stabilizer. The solutions were then placed in a refrigerator and cooled to the temperatures noted, after which they were observed every few hours during the first day and at less frequent intervals thereafter for one month. At the end of this time the solutions that showed very little or no precipitation of paraformaldehyde were tested for pH readings.

The results obtained are indicated in the following table:

solutions it is possible to use as much as 10% of melamine without gelation.

Example 2

Aqueous formaldehyde solutions were prepared and stabilized as in Example 1 and stored at 4° C. for 1 month. They were then warmed to 25° C., the pH was taken, sodium hydroxide was added until the pH was 7 or higher and the solutions were again stored at 4° C. for an additional month. After the second month's storage the solutions were examined and their pH was again

| Stabilizer | Percent | Percent $CH_2O$ | Temp., °C. | Appearance of solution | | | | Glass electrode pH at 25° C. after 1 mo. | Remarks |
|---|---|---|---|---|---|---|---|---|---|
| | | | | Clear | Very slightly cloudy | Slightly cloudy | Cloudy | | |
| Melamine | 2 | 35 | 7 | 29 days | | | | 3.32 | Clear at end of test. |
| Do | 5 | 35 | 7 | do | | | | 3.45 | Do. |
| Do | 10 | 35 | 4 | 1 day | | | | | Cloudy gel after 4 days. |
| Do | 5 | 37 | 7 | 32 days | | | | | Clear at end of test. |
| Do | 1 | 40 | 4 | 2 days | 6 days | 10 days | | | |
| Do | 2 | 40 | 4 | 14 days | 15 days | | | 3.41 | |
| Do | 2 | 40 | 7 | 29 days | | | | 3.31 | Do. |
| Do | 5 | 40 | 4 | 29 days | | | | 3.50 | Do. |
| Do | 10 | 40 | 4 | 1 day | | | | | Clear gel after 4 days. |
| Do | 10 | 40 | 7 | 4 days | | | | | Clear gel after 6 days. |
| Do | 1 | 42 | 4 | 1 day | 3 days | 14 days | | | |
| Do | 2 | 42 | 4 | 8 days | 10 days | | | | |
| Do | 5 | 42 | 4 | 29 days | | | | 3.48 | Clear at end of test. |
| Do | 1 | 44 | 4 | | | 4 days | 14 days | | |
| Do | 2 | 44 | 4 | | | 18 days | | | Do. |
| Do | 5 | 44 | 4 | 29 days | | | | 3.50 | |
| Do | 2 | 45 | 4 | | 4 days | 2 days | 23 days | 3.35 | Soln. v. sl. cloudy before refrigeration. |
| Do | 2 | 45 | 7 | | | 6 days | 23 days | 3.27 | Soln. sl. cloudy before refrigeration. |
| Do | 5 | 45 | 4 | | | 29 days | | 3.47 | Soln. sl. cloudy before refrigeration. |
| Do | 10 | 45 | 4 | | 29 days | | | 3.60 | Soln. v. sl. cloudy before refrigeration. |
| Do | 1 | 44 | 4 | 1 day | 3 days | 14 days | | | Soln. warmed to dissolve stabilizer. |
| Do | 2 | 44 | 4 | 4 days | 14 days | | | | Do. |
| Do | 5 | 44 | 4 | 29 days | | | | 3.41 | Soln. warmed to dissolve stabilizer. Clear at end of test. |
| Hexamethylol melamine | 2 | 37 | 4 | | 14 days | | | | |
| Do | 5 | 37 | 4 | 29 days | | | | 3.80 | Clear at end of test. |
| Do | 2 | 42 | 4 | | | | 3 hrs | | Soln. sl. cl. before refrigeration. |
| Do | 5 | 42 | 4 | | | 3 hrs | 14 days | | Soln. v. sl. cl. before refrigeration. |
| Urea | 5 | 37 | 7 | 7 hrs | 32 days | | | 3.65 | |
| Do | 5 | 42 | 4 | | | 3 hrs | | | Very cloudy after 1 day. |
| None | 0 | 37 | 7 | | | | 30 min | | Do. |

These results show that melamine acts as a strong stabilizer for methanol-free formaldehyde solutions over a wide range of formaldehyde concentrations. However, as a practical matter, it should be noted that the amounts of melamine to be used are limited in two ways. At any chosen concentration of formaldehyde and temperature of refrigeration a certain minimum quantity of melamine is necessary to inhibit the precipitation of formaldehyde polymers and above a certain percentage of melamine a precipitation of melamine-formaldehyde condensation products or gelatin takes place. The same is true of alkylol melamines such as hexamethylol melamine. This working range will be designated as "stabilizing amounts" of the stabilizer. Reference to the table will show that 1-3% of melamine will entirely stabilize 35-40% formaldehyde solutions and 3-6% will stabilize 40-45% formaldehyde solutions, but with the strongest noted at 25° C. The results obtained were as follows:

| Stabilizer | Percent | $CH_2O$ | pH after 1 month | Neutralized to pH | pH after 2d month | Remarks |
|---|---|---|---|---|---|---|
| Urea | 5 | 37 | 3.65 | 7.12 | 4.71 | Slightly cloudy. |
| Melamine | 5 | 37 | 3.90 | 7.30 | 5.21 | Very slightly cloudy. |
| Do | 2 | 35 | 3.80 | 7.38 | 6.10 | Clear. |
| Do | 5 | 35 | 3.84 | 7.82 | 5.60 | Do. |
| Do | 2 | 40 | 3.41 | 7.75 | 5.90 | Very slightly cloudy. |
| Do | 5 | 40 | 3.50 | 7.03 | 5.70 | Clear. |
| Do | 5 | 45 | 3.47 | 7.04 | 6.20 | Cloudy. |
| Do | 10 | 45 | 3.60 | 7.88 | 6.15 | Very slightly cloudy. |

These results show that melamine, in addition to its action in preventing excessive polymerization at low temperatures under both neutral and acid conditions, will also inhibit to a considerable extent the conversion of formaldehyde to formic acid. This is another important advantage of the invention.

What we claim is:

1. An aqueous formaldehyde solution having a formaldehyde content of at least 35% and which is otherwise unstable on storage at low temperatures and containing stabilizing amounts within the range of 1-10% of a compound selected from the group consisting of melamine and methylol melamine.

2. An aqueous formaldehyde solution having a formaldehyde content of approximately 44% and containing stabilizing amounts within the range of 5-10% of a compound selected from the group consisting of melamine and methylol melamine.

3. A method of stabilizing an aqueous formaldehyde solution of at least 35% strength which is unstable on storage which comprises the step of adding thereto stabilizing amounts within the range of 1-10% of a compound selected from the group consisting of melamine and methylol melamine.

ROBERT C. SWAIN.
PIERREPONT ADAMS.